US010545247B2

(12) United States Patent
Zheng et al.

(10) Patent No.: US 10,545,247 B2
(45) Date of Patent: Jan. 28, 2020

(54) COMPUTERIZED TRAFFIC SPEED MEASUREMENT USING SPARSE DATA

(71) Applicant: Microsoft Technology Licensing, LLC, Redmond, WA (US)

(72) Inventors: Yu Zheng, Beijing (CN); Eric Chang, Beijing (CN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 217 days.

(21) Appl. No.: 15/506,450

(22) PCT Filed: Aug. 26, 2014

(86) PCT No.: PCT/CN2014/085134
§ 371 (c)(1),
(2) Date: Feb. 24, 2017

(87) PCT Pub. No.: WO2016/029348
PCT Pub. Date: Mar. 3, 2016

(65) Prior Publication Data
US 2017/0285181 A1    Oct. 5, 2017

(51) Int. Cl.
*G01S 19/52*    (2010.01)
*G08G 1/01*    (2006.01)
(Continued)

(52) U.S. Cl.
CPC ........... *G01S 19/52* (2013.01); *G01S 5/0027* (2013.01); *G08G 1/0112* (2013.01);
(Continued)

(58) Field of Classification Search
CPC ........ G01S 19/52; G01S 19/39; G01S 5/0027; G08G 1/0112; G08G 1/0116;
(Continued)

(56) References Cited

U.S. PATENT DOCUMENTS 5,530,441 A * 6/1996 Takatou .................. G08G 1/04
340/933
5,913,917 A * 6/1999 Murphy .............. B60R 16/0232
701/123
(Continued)

FOREIGN PATENT DOCUMENTS

CN      101952867 A     1/2011
CN      102944887 A     2/2013
(Continued)

OTHER PUBLICATIONS

"Second Office Action Issued in Chinese Patent Application No. 201480061559.3", dated Oct. 19, 2017, 7 Pages.
(Continued)

*Primary Examiner* — Richard A Goldman
(74) *Attorney, Agent, or Firm* — Alleman Hall Creasman & Tuttle LLP

(57) ABSTRACT

A computer system for calculating traffic speed using sparse data. Sensors provide location data, over time, for a sampling of vehicles on the road network, such as a fleet of vehicles. This location data from a sampling of vehicles is sparse with respect to both road segments in the road network and time. From the location data, the computer system generates sample data associating speed of sampled vehicles on the road segments to points of time in a plurality of time slots. The computer system accesses other information that defines correlations among different road segments and among different time slots. The computer system derives at least an average vehicle speed for each road segment in the road network for at least the current time slot using the correlation data and the sparse sample data. The computer system can infer traffic volume from average vehicle speeds, and then compute environmental data.

20 Claims, 10 Drawing Sheets

(51) Int. Cl.
  *G08G 1/052* (2006.01)
  *G01S 5/00* (2006.01)
  *G08G 1/065* (2006.01)
  *G01S 19/39* (2010.01)
(52) U.S. Cl.
  CPC ......... *G08G 1/0116* (2013.01); *G08G 1/0129* (2013.01); *G08G 1/0133* (2013.01); *G08G 1/052* (2013.01); *G08G 1/065* (2013.01); *G01S 19/39* (2013.01); *G08G 1/012* (2013.01)
(58) Field of Classification Search
  CPC .... G08G 1/0129; G08G 1/0133; G08G 1/052; G08G 1/065; G08G 1/012; G08G 1/0104; G08G 1/0141; G08G 1/056; G01C 21/3492; G01C 21/3469; G01C 21/34
  USPC ................... 701/18, 117, 119, 532, 527, 414
  See application file for complete search history.

(56) References Cited

U.S. PATENT DOCUMENTS

| | | | | |
|---|---|---|---|---|
| 6,798,357 | B1* | 9/2004 | Khan | G08G 1/0104 340/989 |
| 8,090,524 | B2* | 1/2012 | Chapman | G01C 21/3691 701/117 |
| 8,290,695 | B2* | 10/2012 | Hiestermann | G01C 21/32 701/119 |
| 8,380,429 | B2* | 2/2013 | Nortrup | G01C 21/3667 701/412 |
| 8,788,185 | B2* | 7/2014 | Yen | G08G 1/0133 455/414.1 |
| 9,081,091 | B2* | 7/2015 | Kalender | G01S 13/723 |
| 9,129,522 | B2* | 9/2015 | Kwon | G08G 1/0112 |
| 2002/0082767 | A1* | 6/2002 | Mintz | G08G 1/01 701/117 |
| 2006/0064236 | A1* | 3/2006 | Hayashi | G08G 1/0104 701/117 |
| 2007/0106465 | A1* | 5/2007 | Adam | G01C 21/3492 701/533 |
| 2007/0208492 | A1* | 9/2007 | Downs | G08G 1/0104 701/117 |
| 2007/0208496 | A1* | 9/2007 | Downs | G08G 1/0112 701/117 |
| 2007/0208500 | A1* | 9/2007 | Sommariva | G08G 1/0104 701/117 |
| 2008/0046165 | A1* | 2/2008 | Downs | G08G 1/0104 701/117 |
| 2008/0071465 | A1* | 3/2008 | Chapman | G01C 21/3691 701/117 |
| 2008/0082251 | A1* | 4/2008 | Ishikawa | G08G 1/0104 701/118 |
| 2008/0234921 | A1* | 9/2008 | Groenhuijzen | G01C 21/3415 701/118 |
| 2008/0243377 | A1* | 10/2008 | Kimita | G08G 1/0104 701/424 |
| 2009/0070025 | A1* | 3/2009 | Kumagai | G08G 1/0112 701/117 |
| 2009/0292456 | A1* | 11/2009 | Inoguchi | G09B 29/007 701/118 |
| 2010/0076671 | A1* | 3/2010 | Pryakhin | G01C 21/32 701/119 |
| 2010/0138141 | A1* | 6/2010 | Hayashida | G01C 21/26 701/118 |
| 2011/0106416 | A1* | 5/2011 | Scofield | G08G 1/0104 701/119 |
| 2011/0184588 | A1* | 7/2011 | Brusilovsky | G01C 21/3407 701/1 |
| 2011/0202266 | A1* | 8/2011 | Downs | G08G 1/0104 701/119 |
| 2011/0224893 | A1* | 9/2011 | Scofield | G01C 21/3492 701/119 |
| 2011/0282567 | A1* | 11/2011 | Nortrup | G01C 21/3667 701/118 |
| 2011/0307165 | A1* | 12/2011 | Hiestermann | G01C 21/32 701/119 |
| 2012/0072096 | A1* | 3/2012 | Chapman | G08G 1/0133 701/118 |
| 2012/0253647 | A1* | 10/2012 | Srinivasan | G08G 1/0112 701/117 |
| 2013/0073193 | A1* | 3/2013 | Heavey | G08G 1/0112 701/119 |
| 2013/0144460 | A1* | 6/2013 | Ricci | H04W 4/90 701/1 |
| 2013/0151088 | A1* | 6/2013 | Ricci | G06F 17/00 701/51 |
| 2013/0297175 | A1* | 11/2013 | Davidson | G07B 15/06 701/99 |
| 2013/0304347 | A1* | 11/2013 | Davidson | G06Q 10/083 701/99 |
| 2013/0304348 | A1* | 11/2013 | Davidson | G06Q 10/083 701/99 |
| 2013/0304349 | A1* | 11/2013 | Davidson | G08G 1/0112 701/99 |
| 2014/0278032 | A1* | 9/2014 | Scofield | G01C 21/3492 701/118 |
| 2015/0066270 | A1* | 3/2015 | Ogawa | G01C 21/3469 701/22 |
| 2015/0088335 | A1* | 3/2015 | Lambert | G08G 1/162 701/1 |
| 2016/0069695 | A1* | 3/2016 | Broadbent | G01C 21/3691 701/411 |
| 2016/0189544 | A1* | 6/2016 | Ricci | G07C 5/008 701/117 |
| 2017/0191834 | A1* | 7/2017 | Fowe | G01C 21/10 |
| 2017/0285181 | A1* | 10/2017 | Zheng | G08G 1/0112 |

FOREIGN PATENT DOCUMENTS

| | | |
|---|---|---|
| CN | 103280098 A | 9/2013 |
| WO | 2007103180 A2 | 9/2007 |

OTHER PUBLICATIONS

Greenshields, Bruce D., "A Study of Traffic Capacity", In Proceedings of 14th Annual Meeting Highway Research Board, Retrieved on: May 9, 2014, 30 pages.

Guhnemann, et al., "Monitoring Traffic and Emissions by Floating Car Data", In Working Paper ITS-WP-04-07, Mar. 2004, 19 pages.

Helbing, Dirk, "Traffic and Related Self-Driven Many-Particle Systems", In Proceedings of Reviews of Modern Physics, vol. 73, Dec. 1, 2001, 75 pages.

Honicky, et al., "N-Smarts: Networked Suite of Mobile Atmospheric Real-Time Sensors", In Proceedings of 2nd ACM SIGCOMM Workshop on Networked Systems for Developing Regions, Aug. 18, 2008, pp. 25-29.

Kwon, et al., "Modeling Freeway Traffic with Coupled HMMs", In Technical Report, May, 2000, 7 pages.

Lou, et al., "Map-Matching for Low-Sampling-Rate GPS Trajectories", In Proceedings of 17th ACM SIGSPATIAL International Symposium on Advances in Geographic Information Systems, Nov. 4, 2009, 10 pages.

Munoz, et al., "Traffic Density Estimation with the Cell Transmission Model", In Proceedings of the American Control Conference, Jun. 4, 2003, pp. 3750-3755.

Ntziachristos, et al., "Copert III. Computer Programme to Calculate Emissions from Road Transport, Methodology and Emission Factors (Version 2.1)", In Technical report No. 49, Nov. 2000, 86 pages.

Panis, et al., "Modelling Instantaneous Traffic Emission and the Influence of Traffic Speed Limits", In Proceedings of Science of the Total Environment, vol. 371, Issue 1-3, Dec. 1, 2006, 2 pages.

Schafer, et al., "A Traffic Information System by Means of Real-Time Floating-Car Data", In Proceeding of ITS World Congress, vol. 2, Oct. 2002, 8 pages.

Smit, et al., "Validation of Road Vehicle and Traffic Emission Models—A Review and Meta-Analysis", In Atmospheric Environment, vol. 44, Issue 25, Aug. 2010, 3 pages.

(56) References Cited

OTHER PUBLICATIONS

Steed, et al., "e-Science in the Streets: Urban Pollution Monitoring", In Proceedings of 2nd UK e-Science All Hands Meeting, Sep. 2, 2003, 7 pages.
Wilkie, et al., "Flow Reconstruction for Data-Driven Traffic Animation", In Journal ACM Transactions on Graphics, vol. 32, Issue 4, Jul. 2013, 10 pages.
Yuan, et al., "T-Drive: Driving Directions Based on Taxi Trajectories", In Proceedings of the 18th SIGSPATIAL International Conference on Advances in Geographic Information Systems, Nov. 1, 2010, 10 pages.
Zhang, et al., "Spatio-Temporal Compressive Sensing and Internet Traffic Matrices", In Proceedings of the ACM SIGCOMM Conference on Data Communication, Aug. 17, 2009, pp. 267-278.
Zhu, et al., "A Compressive Sensing Approach to Urban Traffic Estimation with Probe Vehicles", In IEEE Transactions on Mobile Computing, vol. 12, Issue 11, Nov. 2013, pp. 2289-2302.
Xiang, et al., "Traffic Data Interpolation Method of Non-Detection Road Link Based on Kriging Interpolation", In Journal of Traffic and Transportation Engineering, vol. 11, Issue 3, Jun. 30, 2011, pp. 118-126.
Castro, et al., "Urban Traffic Modelling and Prediction using Large Scale Taxi GPS Traces", In Proceedings of the 10th International Conference on Pervasive Computing, Jun. 18, 2012, 17 pages.
Phan, et al., "Obtaining Dense Road Speed Estimates from Sparse GPS Measurements", In 11th International IEEE Conference on Intelligent Transportation Systems, Oct. 12, 2008, pp. 157-162.
Hofleitner, et al., "Learning the Dynamics of Arterial Traffic from Probe Data Using a Dynamic Bayesian Network", In IEEE Transactions on Intelligent Transportation Systems, vol. 13, Issue 4, Dec. 2012, 15 pages.
Hunter, et al., "Path and Travel Time Inference from GPS Probe Vehicle Data", In Proceedings of Neural Information Processing Systems Foundation, Dec. 2009, 8 pages.
Barbosa, et al., "Average Speed Estimation for Road Networks Based on GPS Raw Trajectories", In Proceedings of the 15th International Conference on Enterprise Information Systems, vol. 1, Jul. 4, 2013, 8 pages.
Liu, et al., "Mobile Phone Tracking: in Support of Modelling Traffic-Related Air Pollution Contribution to Individual Exposure and its Implications for Public Health Impact Assessment", In Proceedings of Environmental Health, Mar. 3, 2013, 12 pages.
Fabritiis, et al., "Traffic Estimation and Prediction Based on Real Time Floating Car Data", In 11th International IEEE Conference on Intelligent Transportation Systems, Oct. 12, 2008, pp. 197-203.
Westgate, et al., "Travel Time Estimation for Ambulances Using Bayesian Data Augmentation", In the Annals of Applied Statistics, vol. 7, No. 2, Jun. 2013, 24 pages.
Li, et al., "ICAMF: Improved Context-aware Matrix Factorization for Collaborative Filtering", In 25th IEEE International Conference on Tools with Artificial Intelligence, Nov. 4, 2013, pp. 63-70.
"International Search Report and Written Opinion Issued in PCT Application No. PCT/CN2014/085134", dated May 28, 2015, 16 Pages.
Office Action issued in European Patent Application No. 14900422.8, dated Apr. 26, 2018, 6 Pages.
"Office Action Issued in European Patent Application No. 14900422.8", dated Sep. 7, 2017, 4 Pages.
Wanli, et al., "Real-Time Road Traffic Prediction with Spatia-Temporal Correlations", In the Proceedings of the Transportation Research, Part C, Issue 19, Oct. 17, 2010, 11 Pages.
"First Office Action and Search Report Issued in Chinese Patent Application No. 201480061559.3", dated Mar. 17, 2017, 15 Pages.

\* cited by examiner

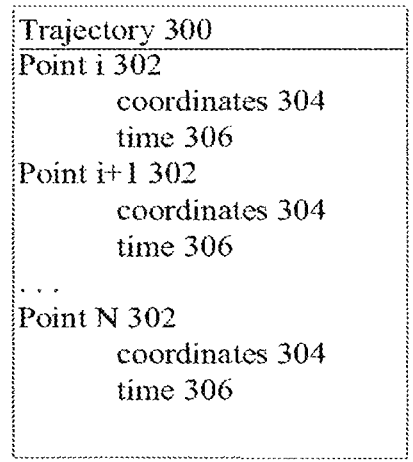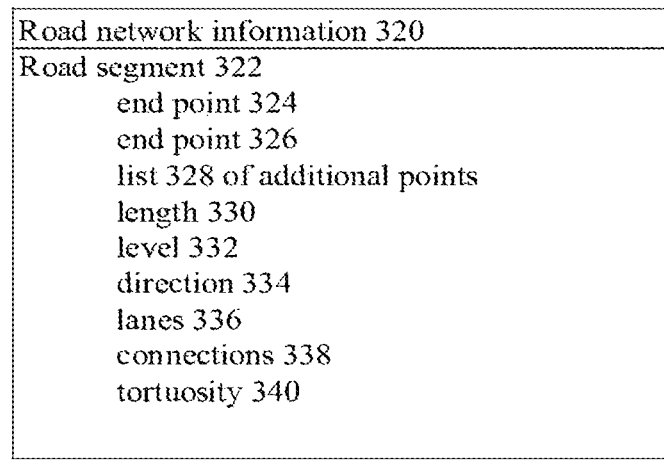
FIG.3

$$M_r = \begin{bmatrix} & r_1 \cdots\cdots & r_j \cdots & r_n \\ t_1 & (22, 6.1) & (v_{1,i}, dv_{1,i}) & \\ t_2 & (12, 4.5) & (v_{2,i}, dv_{2,i}) & \\ t_i & \text{Null} \cdots\cdots & (v_{i,i}, dv_{i,i}) \cdots\cdots & \\ t_j & (48, 8.6) & (v_{i,j}, dv_{i,j}) & \\ t_m & (17, 1.6) & (v_{n,i}, dv_{n,i}) & \end{bmatrix} \overset{600}{}$$

$$M_g = \begin{bmatrix} & g_1 & g_2 \cdots\cdots & g_{16} \\ t_1 & 22 & 50 & 14 \\ t_2 & 16 & 8 & 27 \\ t_i & 23 & 6 \cdots\cdots & 26 \\ & 9 & 42 & 72 \\ t_j & 11 & 2 & 49 \\ t_m & 61 & 7 & 91 \end{bmatrix} \overset{602}{}$$

FIG.6

$$\begin{array}{c} \phantom{t_i}\begin{array}{cc} g_1 g_2 \cdots g_{16} & g_1 g_2 \cdots g_{16} \end{array} \\ \begin{array}{c} t_i \\ t_{i+1} \\ \vdots \\ t_j \end{array} \left[ \begin{array}{c|c} M'_G & M_G \end{array} \right] \end{array} \quad \Longleftrightarrow \quad \begin{array}{c} \phantom{t_i}\begin{array}{cc} r_1 r_2 \cdots r_n & r_1 r_2 \cdots r_n \end{array} \\ \begin{array}{c} t_i \\ t_{i+1} \\ \vdots \\ t_j \end{array} \left[ \begin{array}{c|c} M'_r & M_r \end{array} \right] \end{array} \quad \Longleftrightarrow \quad \begin{array}{c} \phantom{r_1}\begin{array}{ccc} f_1 & f_2 & \cdots f_k \end{array} \\ \begin{array}{c} r_1 \\ r_2 \\ \vdots \\ r_n \end{array} \left[ \begin{array}{c|c|c} f_r & f_p & f_g \end{array} \right] \end{array}$$

$$Y \quad\quad\quad\quad X \quad\quad\quad\quad Z$$

FIG.7

COMPUTERIZED TRAFFIC SPEED MEASUREMENT USING SPARSE DATA

CROSS-REFERENCE TO RELATED APPLICATIONS

Pursuant to 35 U.S.C. § 371, this application is the United States National Stage Application of International Patent Application No. PCT/CN2014/085134, filed Aug. 26, 2014.

BACKGROUND

Vehicles travelling on roads in cities consume significant amounts of fuel and generate various forms of emissions. The ability to make policy decisions about fuel consumption and vehicle emissions is premised on an assumption that the root cause of, and likely effects of traffic-related decisions on, fuel consumption and vehicle emissions can be predicted. Such predictions in turn are dependent on reasonably accurate measurements of actual fuel consumption and vehicle emissions generated by actual traffic.

SUMMARY

This Summary is provided to introduce a selection of concepts in a simplified form that are further described below in the Detailed Description. This Summary is intended neither to identify key or essential features, nor to limit the scope, of the claimed subject matter.

A computer system measures traffic speed in a geographic area with a road network of plurality of road segments, such as a city or urban environment. Sensors can provide location data, over time, for a sampling of vehicles on the road network, such as a fleet of vehicles. This location data from a sampling of vehicles on the road segments is sparse with respect to both the road segments and time. The computer system accesses sample data associating speed of sampled vehicles on the road segments to points of time in a plurality of time slots. This sample data can be derived from the location data from the sensors. This sample data also is sparse with respect to both the road segments and time. The computer system also accesses other information that defines correlations among different road segments and among different time slots. Such correlation data can include geographic information and historical sample data. The computer system derives at least an average vehicle speed for each road segment in the road network for at least the current time slot using the correlation data and the sparse sample data. The computer system can infer traffic volume from estimated average vehicle speed, providing a measure of traffic volume for each road segment for which an average vehicle speed has been computed. In turn, the computer system can compute various environmental data such as fuel consumption and vehicle emissions. Such information can be provided in a matter of minutes after receiving the location data from the sensors for any given time slot.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is a diagram of illustrative examples of data structures.

FIG. 6 is a diagram of example matrices of historic traffic data.

FIG. 7 is a diagram of example matrices used to compute average traffic speed for each road segment.

DETAILED DESCRIPTION

The following section describes an example implementation of a computer system that measures traffic speed in a road network, such as in an urban environment with many road segments and many vehicles.

Figure 1:
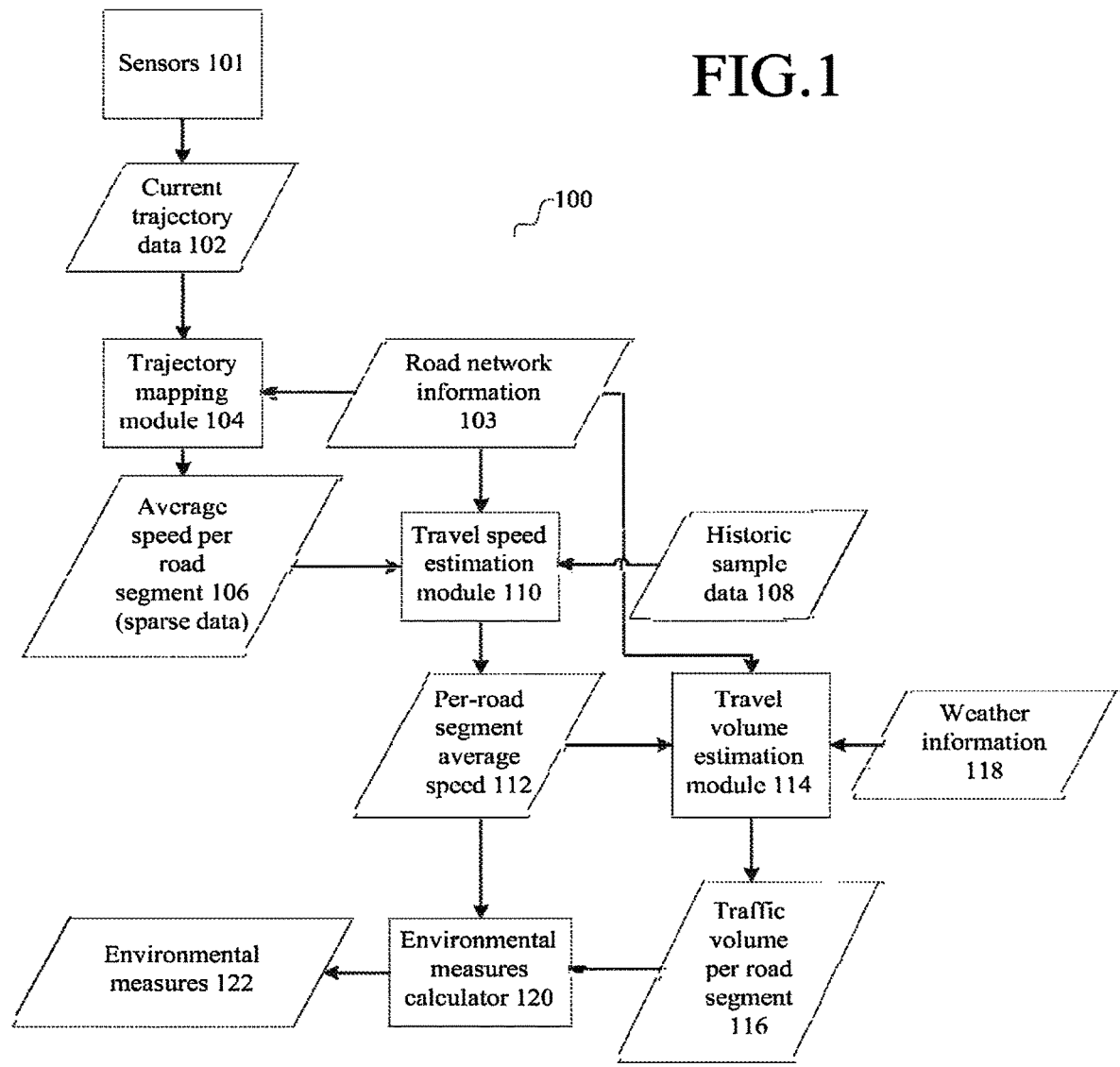
FIG. 1 is a block diagram of an example application environment in which a computer system supports measuring traffic speed, traffic volume, fuel consumption and emissions for road segments in a geographic area.

A computer system 100 measures traffic speed using sample data associating speed of sampled vehicles on road segments to points of time in a plurality of time slots. Such sample data can be derived from location data received from sensors that provide location data over time of the sampled vehicles. This location data is shown in FIG. 1 as current trajectory information 102 for the sampled vehicles. The sampled vehicles represent a sampling of vehicles in actual traffic. The current trajectory information 102 defines, for each sampled vehicle of vehicles currently on road segments in a road network, locations over time for the vehicle in a period of time, or time slot. For example, as described in more detail below, for a given vehicle, the trajectory information can be defined by a sequence of time-ordered spatial points, with each point being a pair of: a time and a geospatial coordinate set, representing the vehicle position at that time.

The location data for a sample of vehicles in actual traffic can be obtained in many ways. In one implementation, a fleet of vehicles is used, where each vehicle in the fleet is equipped with a sensor 101 that provides the location and time stamp for the vehicle. A fleet can include any of a variety of types of vehicles, such as taxis, buses, trucks, livery services, or other defined set of vehicles. The sensor can include any of a variety of devices that can detect and communicate the location of a vehicle at a point in time. Such sensors transmit the vehicle identification and position to the computer system for performing a real time measurement for data collected within a time slot. The computer system in turn can compute the speed, volume and environmental measures within a time slot to provide the measures in real time.

A global positioning system (GPS) device is one example of such a sensor. The global positioning system data includes, for each uniquely identified vehicle, its corresponding global position coordinates at each time in a sequence of times. Such information also can be provided through localization data of a wireless local area network, loop sensors in road segments, radio frequency identification (RFID) sensors, and toll gate sensors, and similar sensors. In general, a sensor detects a presence of a vehicle at a location and transmits location data and identification data for the vehicle to a receiver. The data from a sensor has an associated time, and can be time stamped by the sensor, transmitter or receiver. Data from multiple sensors is collected and stored in computer storage as current trajectory data 102 for access by the computer system.

The road network within which traffic is sampled can be represented by road network information 103. The road network information can be defined by a set of interconnected road segments, where each road segment is represented by data including at least two terminal points in the geospatial coordinate set and a length.

The current trajectory information 102 and road network information 103 are inputs to a trajectory mapping module 104. The trajectory mapping module processes the current trajectory information 102 to map each point in the trajectory for a vehicle to a road segment. Such a mapping can be avoided if the location information for a vehicle already includes data indicating the road segment on which the vehicle is traveling. Given the mapping of points in trajectory information to road segments, the trajectory mapping module 104 computes sample data 106 associating speed of sampled vehicles on the road segments to points of time in a plurality of time slots. This sample data is a measure of the instantaneous traffic on the road segments on which the fleet has actually traveled. As described in more detail below, in one implementation this sample data 106 can include an average vehicle speed on each road segment on which vehicles traveled during a time slot.

The location data (e.g., current trajectory data 102) from a sampling of vehicles on the road segments, and sample data (e.g., instantaneous traffic information 106) associating speed of sampled vehicles on the road segments to points of time in a plurality of time slots, are sparse data sets with respect to both the road segments and time. The computer system uses this sparse data to measure average vehicle speed on each road segment, including road segments for which there is no sample data. To perform such a computation, the computer system also accesses other information that defines correlations among different road segments and among different time slots. Such correlation data can include, for example, geographic information and historical sample data or yet other data.

As an example of such correlation data, the road network information 103 can be augmented to include other information for each road segment in addition to the endpoints of the road segment. Such additional geographic information can include, but is not limited to, a set of intermediate points describing the road segment, a type (e.g., highway, urban street), a number of lanes, and a direction (e.g., one-way or bidirectional). Road network information 103 can include points of interest in the geographic area. A point of interest can be represented, for example, by at least a geospatial coordinate set or a road segment with which the point of interest is associated, and other attributes, such as a name, category, address, and the like.

As another example of correlation data, the sample data (e.g., instantaneous traffic information 106) can be collected over time by time slot to provide historical information 108.

The instantaneous traffic information 106 and correlation data, such as historical information 108 and road network information 103, are input to a travel speed estimation module 110. The travel speed estimation module 110 processes its inputs to generate an average vehicle speed 112 for each road segment in the road network, in a manner described in more detail below. The variance of the average vehicle speed also can be computed. In particular, the instantaneous traffic information is a sparse data set representing average speeds of fleet vehicles on the road segments on which those vehicles traveled. Because many road segments are not traveled by the fleet during the time period from which the samples were gathered, the sample data is sparse relative to all of the road segments. The travel speed estimation module uses the correlation information from other sources, such as historical information and road network information, to deal with data sparsity to compute an average vehicle speed for the other road segments for which there is no sample data.

The average vehicle speed 112 and road network information 103 are input to a travel volume estimation module 114. Other information also can be provided as an input, such as weather information 118. The travel volume estimation module 114 processes its inputs to generate an estimate of the traffic volume 116 for each road segment, in a manner described in more detail below in connection with FIG. 9.

Given the average traffic speed and traffic volume for each road segment, various environmental data can be computed. For example, fuel consumption and emissions can be computed. In FIG. 1, an environmental measures calculator 120 receives the traffic speed 112 and traffic volume 116 measures, and outputs environmental measures 122. An example model for such calculation is the COPERT model, for which the portions that compute "hot emissions" can be determined using the traffic speed and volume data. Another example model for such calculation is the MOBILE model.

Each module of the computer system such as described in FIG. 1 can be implemented using one or more processing units of one or more computers with one or more computer programs processed by the one or more processing units. Such a computer is described in more detail below in connection with FIG. 10. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures. This computer system may be implemented in a distributed computing environment, where different modules can be implemented on different computers that are linked through a communications network. A module in itself can be implemented using multiple computers. In a distributed computing environment, computer programs may be located in both local and remote computer storage media.

A flowchart illustrating an example operation of a computer system such as shown in FIG. 1 will now be described in connection with FIG. 2.

Figure 2:
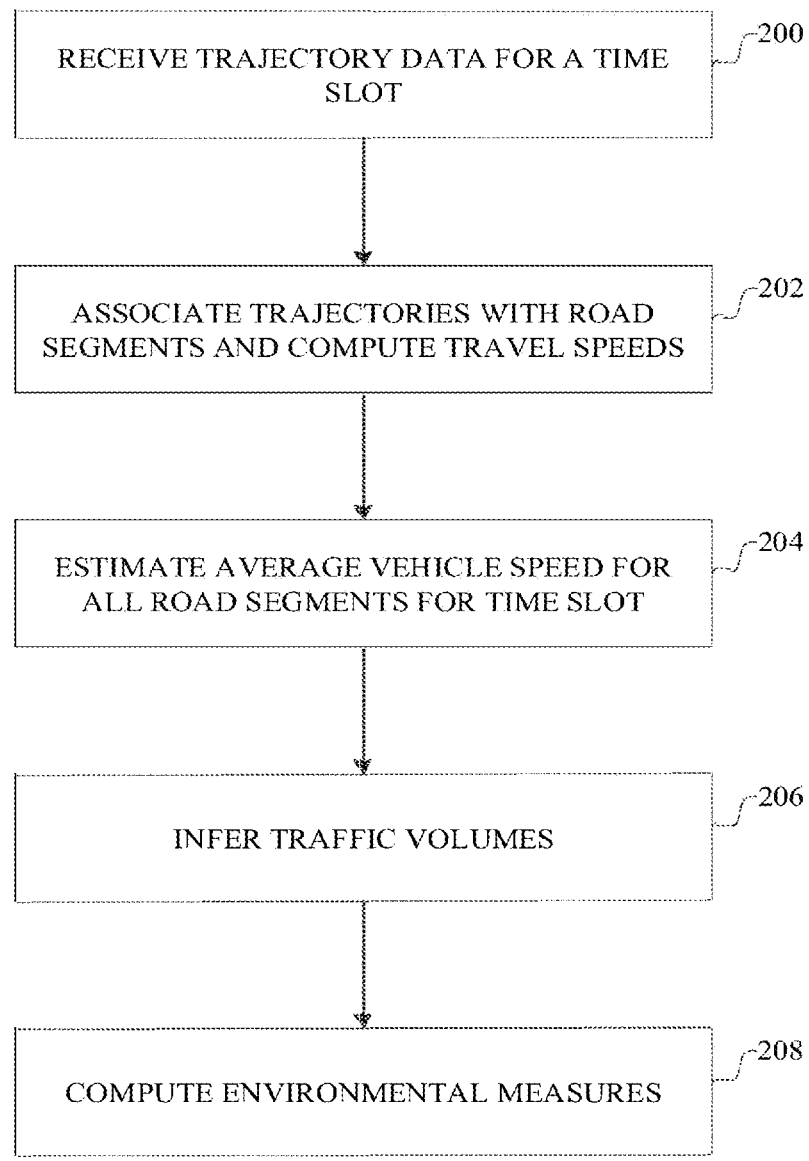
FIG. 2 is a flowchart describing an example process of operation of a computer system such as in FIG. 1.

In FIG. 2, the computer system receives 200 trajectory data for a sample of vehicles on a plurality of roads over a given time slot. The time slot can be any period of time sufficient to provide several locations for a vehicle during the time slot. For example, a time slot duration of ten minutes with sample times at two minute intervals is suitable. A trajectory mapping module associates 202 the trajectory data for a vehicle with road segments of the plurality of roads, if such an association is not provided by the trajectory data, and computes an average travel speed of the vehicle on for the road segments on which it traveled. The result is sparse data representing average travel speeds of sampled vehicles in a time slot on a few of the road segments in the road network. A travel speed estimation module accesses the road network information and the mapped trajectory data, and estimates 204 an average travel speed for vehicles on all of the road segments in the road network. Similarly, a travel volume estimation module accesses the road network information and the average travel speed information, and infers 206 a travel volume for each road segment. An environmental measures module computes 208 various environmental measures from the estimate travel speed and estimated travel volume.

Details of an example implementation of such a computer system will now be described in connection with FIGS. 3-9.

In FIG. 3, example data structures for a computer program are shown for each of the trajectory data and road network information. Such data structures can be implemented in persistent storage, for example in a database or a data file. Such data structures can be implemented in memory. In general, such data structures are in memory for the purposes of computations performed, using the data, by various modules of the computer system.

In FIG. 3, a trajectory 300 of a vehicle for a given time slot can be represented by a time-ordered sequence of spatial points 302. Each point 302 can be represented by a coordinate set 304 and a time 306. The coordinate set can be two-dimensional coordinates in any format, such as geospatial coordinates. The time can be in any format, and can represent time of day, such as in the form of hours, minutes and seconds, and optionally can include the date. There are multiple such trajectories, one for each vehicle, for the period of time for which traffic sampled. Optionally, the trajectory data structure 300 can include an identifier of the vehicle to which the trajectory is associated.

Also in FIG. 3, road network information 320 can be represented using a set of road segments 322. The set can be represented by, for example, a graph or sorted or unsorted list. Each road segment 322 can be represented by two endpoints 324, 326, and can optionally be represented as a directed edge between those two endpoints. Optionally, a list 328 of additional points describing the road segment (e.g., for a curvy road) can be included. Other information that can be represented includes, but is not limited to, a length 330, a level 332 (e.g., highway, urban street), a direction 334 (e.g., one-way or bidirectional), a number of lanes 336, a number of connections 338 (number of other road segments sharing endpoints 324, 326) and the like. A measure of tortuosity 340 of a road segment can be computed or stored, and is a function of, such as the ration between, the length 330 of the road segment and the mathematical distance in coordinate space between the end points 324, 326 of the segment.

The data structure for a trajectory can be modified to include a reference to the road segment to which it is associated. Alternatively, the data structure for a road segment can include a reference to the trajectory and point within the trajectory with which it is associated. As another alternatively, a separate data structure can associate a point in a trajectory with a road segment.

Figure 4:
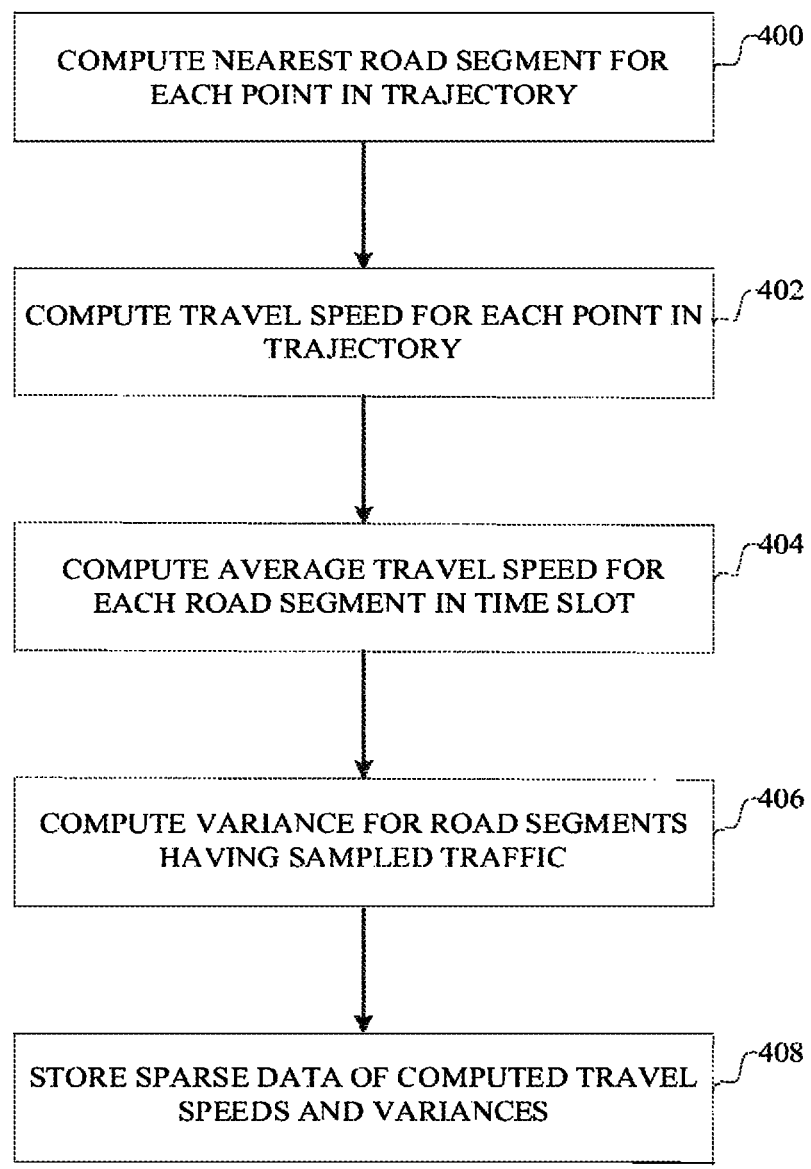
FIG. 4 is a flowchart describing operation of the example implementation of a trajectory mapping module.

Referring to FIG. 4, trajectory information for a given time slot and road network information can be inputs to a trajectory mapping module. In one implementation described in connection with FIG. 4, the trajectory mapping module implements a map matching algorithm to project each trajectory in the trajectory information onto the road segments. In general, the trajectory mapping module computes 400, for each point in a trajectory, the nearest road segment in the set of road segments. Data associating a point in a trajectory with its corresponding road segment can be stored in a data structure such as described above in connection with FIG. 3, or in a separate data structure.

Next, the trajectory mapping module computes 402, for each point in each trajectory, a travel speed. As an example, the travel speed for a point can be computed by computing a. the road network distance between the point and an adjacent point (such as the immediately subsequent point or the immediately preceding point) in the trajectory, and b. the difference in time between the same two points in the trajectory, and then c. the quotient of the computed road network distance divided by the difference in time.

The trajectory mapping module then can compute 404, for each road segment having trajectory points mapped to it, an average of the travel speed for that road segment. To ensure quality of data, such a computation can be limited to road segments for which there is a minimum amount of data. For example, computation of the average can be limited to road segments that have at least three vehicles that have traveled on the road segment. For example, the trajectory mapping module can compute the average speed of a road segment as function of the average travel speed, all travel speeds computed for points mapped to that road segment and the number of points mapped to that road segment. For example, the sum of the travel speeds can be divided by the number of points.

The trajectory mapping module can also compute 406, for each road segment having trajectory points mapped to it, i.e., having sampled traffic, a variance of the computed travel speeds. For example, the trajectory mapping module can compute the variance of the average travel speed of a road segment as function of all travel speeds computed for points mapped to that road segment and the number of points mapped to that road segment. For example, the average of the squared differences of the travel speeds from the average speed can be computed.

After computing the speed, average speed and variance data for each road segment having sampled traffic, for a given time slot, based on the sampled vehicle data from that time slot, the trajectory mapping module can store 408 this information, for example in a database or data file, as historic traffic pattern data.

As noted above, the instantaneous traffic data output the by the trajectory mapping module can be combined with historic traffic pattern data and other road network information to compute average travel speed and travel volume from such sparse data. Examples of the road network information will now be described in connection with FIG. 5.

Figure 5:
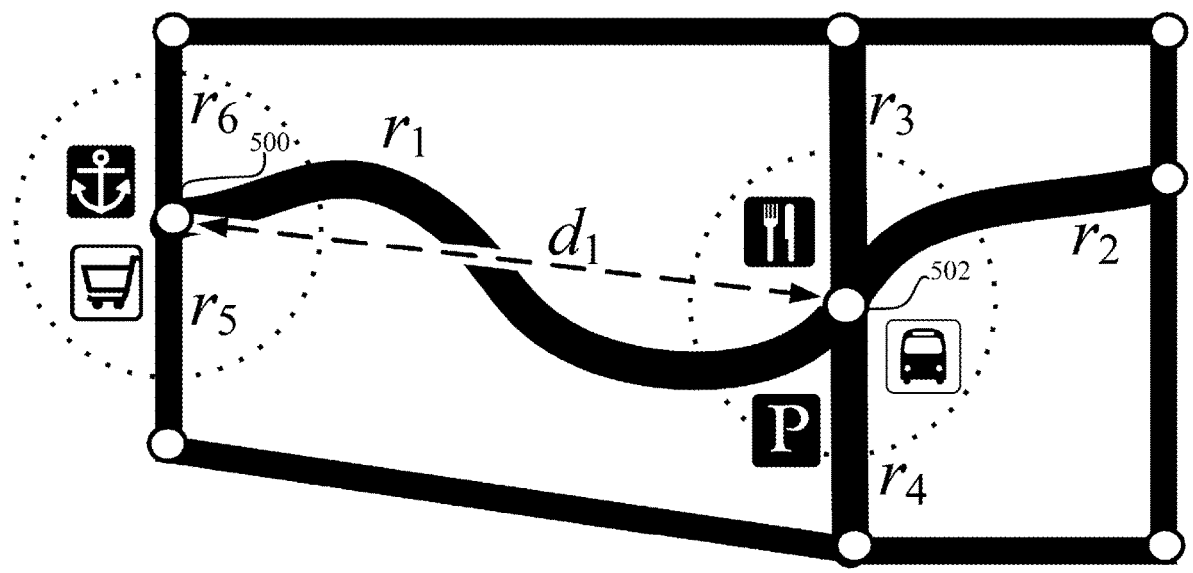
FIG. 5 is a diagram of an illustrative example of a set of road segments.

In FIG. 5 an example set of road segments is shown. From the data structure described in FIG. 3, example road network features to be considered are the segment length, level, direction, number of lanes, number of connections and tortuosity. As an example, segment R1 in FIG. 5 has two connections at one endpoint 500, and three connections at another endpoint 502, and thus 5 connections. Its tortuosity is its length divided by the distance d1 between the endpoints. The set of road segment features can be represented as a matrix, with a row for each road segments and a column for each road segment feature.

Points of interest also can be part of the road network information. Features related to the points of interest can be part of the matrix of road segment features as one or more columns. A point of interest can be, for example, any venue associated with a road segment. In one implementation, for each road segment, points of interest with a radius of each endpoint of the road segment are identified. Data about points of interest can be extracted from various data sets, to provide for each point of interest, its coordinates, which are then compared to the coordinates of the road segments. Point of interest-related features that can be computed include, for example, a distribution of points of interest across a set of categories. An illustrative example of a set of (eleven) categories is: schools, companies and offices, banks and automated teller machines, malls and shopping, restaurants, gas stations and vehicle services, parking, hotels, residences, transportation, entertainment and living services. In the Example of FIG. 5, a point of interest feature vector for road segment R1 is (0,0,0,1,1,0,1,0,0,2,0). This feature can be normalized into a distribution.

Further geographical feature information also can be included as part of the road network information. Such features also can be included in the matrix of road segment features as one or more columns. This feature can be used to designate a region of a geographic area in which a road segment falls. In one illustrative example, if a geographic area is divided into a grid of cells, with each cell being numbered, then an array of binary values can represent each cell. The array length is the number of cells. For any given cell, the entries of the array corresponding to that cell's neighbors are set to "1". If two cells are geographically close to each other, then their arrays will be similar.

If such features are represented in a matrix, then road segments for which the sets of road segment features and point of interest features are similar could have similar traffic conditions. In addition if the geographical features are also similar, then these road segments could have more similar traffic conditions. Such geographic information defines a correlation among the road segments.

The present invention is not limited to any particular set of road segment features, point of interest features or geographical features associated with road segments. Generally speaking, a matrix of values is determined such that road segments with similar values are considered to have similar traffic conditions, for the purposes of computing traffic speed and volume from the sparse traffic data described above. In this illustrative example, such information also is generally static information about the road segments and can be computed once and/or updated infrequently.

Examples of the historic traffic pattern data will now be described in connection with FIG. 6.

Historic traffic pattern data define traffic patterns as they change over time of day, based on historical trajectory data. The historic traffic pattern data also can be represented as a matrix in which each row denotes a time slot and each column denotes a road segment or geographic region. Separate matrices can be maintained for holidays, weekend days and business days. In one implementation, as shown in FIG. 6, one matrix 600 is used for fine-grained, road segment level data; another matrix 602 is used for coarse-grained region level data. For example, if a geographic area is divided into a set of cells, such as for determining geographical position features as described above, the geographic area represented by each row can be one of these cells.

The value stored at each row, column location in the matrix is the average traffic condition (average speed and variance) computed for that region over a given time period. For example, each time slot (i.e., a row in the matrix) can represent an M-minute time span during a day (e.g, M can be 10 minutes), and each cell can be the average of values for a road segment in this time slot over the last N days (e.g., N can be 60 days).

Given the average speed and variance of the road segments for the sampled vehicles in a time slot, and immediately previous time slots, and the road network information as described above, the estimates of the average speed and variance of all road segments in the geographic area then can be computed. An example implementation of such computation will now be described in connection with FIGS. 7 and 8.

Using correlation data, such as the historical data and road network data, in addition to the sparse data from the sampled vehicles, a context-aware matrix factorization approach is used to compute the estimated traffic conditions. In particular, matrices built using historical data, which model temporal correlations between different time slots, and matrices built using road features, which model geographical similarity of road segments, provide context to the problem of completing the sparse data matrix of recent trajectory data built from sample data for the most recent time slots. The combination of matrices can be factorized to complete the sparse data matrix and provide average speed and variance data for all road segments.

As illustrated in FIG. 7, three matrices X, Y, and Z. Matrices Mr' and MG' are matrices build on the recent trajectory data from the sampled vehicles from recent time slots ti through tj, where tj is the current time slot. Matrices Mr and MG are the traffic pattern matrices built over a long period of time, corresponding to the same time slots from ti through tj. Thus, matrix X is the concatentation of matrices Mr'||Mr, matrix Y is the concatenation of matrices MG'||MG, and Z is the feature matrix containing physical features of roads. Matrices Mr and MG of an entire day can be built in advance in memory, and, for each time slot tj, the entries from time slots ti to tj can be retrieved to construct matrices Mr and MG, as shown in the dashed line in FIG. 6. Thus, current traffic conditions on a road network is estimated by filling in the missing values in each row tj of M'r using data from matrices Mr, Y and Z.

Combining matrices Mr and M'r together, and similarly combining matrices MG and MG' together, reveals deviation of current traffic conditions from the corresponding historical traffic patterns. Additionally, matrices Mr and MG, built over a long period of time, are much more dense than the recently received data. As a result, the formulation of matrices X and Y can help tackle the data sparsity problem.

In turn, matrices X, Y and Z can be decomposed as follows:

$$Y \approx T \times (G;G)^T;\ X \approx T \times (R;R)^T;\ Z \approx R \times F^T, \quad (4)$$

where matrices T, G, R, and F are low-rank matrices representing latent factors. Matrices X and Y share a latent factor T. Matrices X and Z share a latent factor R. As matrices Y and Z can be built from other data sources, e.g., historical trajectories and map data, they are more dense than matrix X. Consequently, matrices Y and Z can be used to improve accuracy of computation of the missing data in matrix X by factorizing matrices X, Y and Z collaboratively. After factorization, matrix X can be recovered through the production of matrix T and the transpose of matrix (R;R). The objective function is defined as Equation 5, below:

$$L(T, R, G, F) = \frac{1}{2}\|Y - T(G;G)^T\|^2 + \frac{\lambda_1}{2}\|X - T(R;R)^T\|^2 + \frac{\lambda_2}{2}\|Z - RF^T\|^2 + \frac{\lambda_3}{2}(\|T\|^2 + \|R\|^2 + \|G\|^2 + \|F\|^2), \quad (5)$$

where $\|.\|$ denotes the Frobenius norm. The first three terms in the objective function in equation (5) control the loss in matrix factorization, and the last term controls the regularization over the factorized matrices so as to prevent over fitting. Next, the objective function is iteratively minimized according to a gradient descent algorithm shown in FIG. 8. Specifically, the gradients for each variable are defined by the following in equation (6):

$$\nabla_T L = [T(G;G)^T - Y](G;G)^T + \lambda_1 (T(R;R)^T - X)(R;R)^T + \lambda_3 T,$$

$$\nabla_R L = \lambda_1 [T(R;R)^T - X]^T T + \lambda_2 (RF^T - Z)F^T + \lambda_3 R,$$

$$\nabla_G L = (T(G;G)^T - Y)^T T + \lambda_3 G,$$

$$\nabla_F L = \lambda_2 (RF^T - Z)^T T + \lambda_3 F. \quad (6)$$

Figure 8:
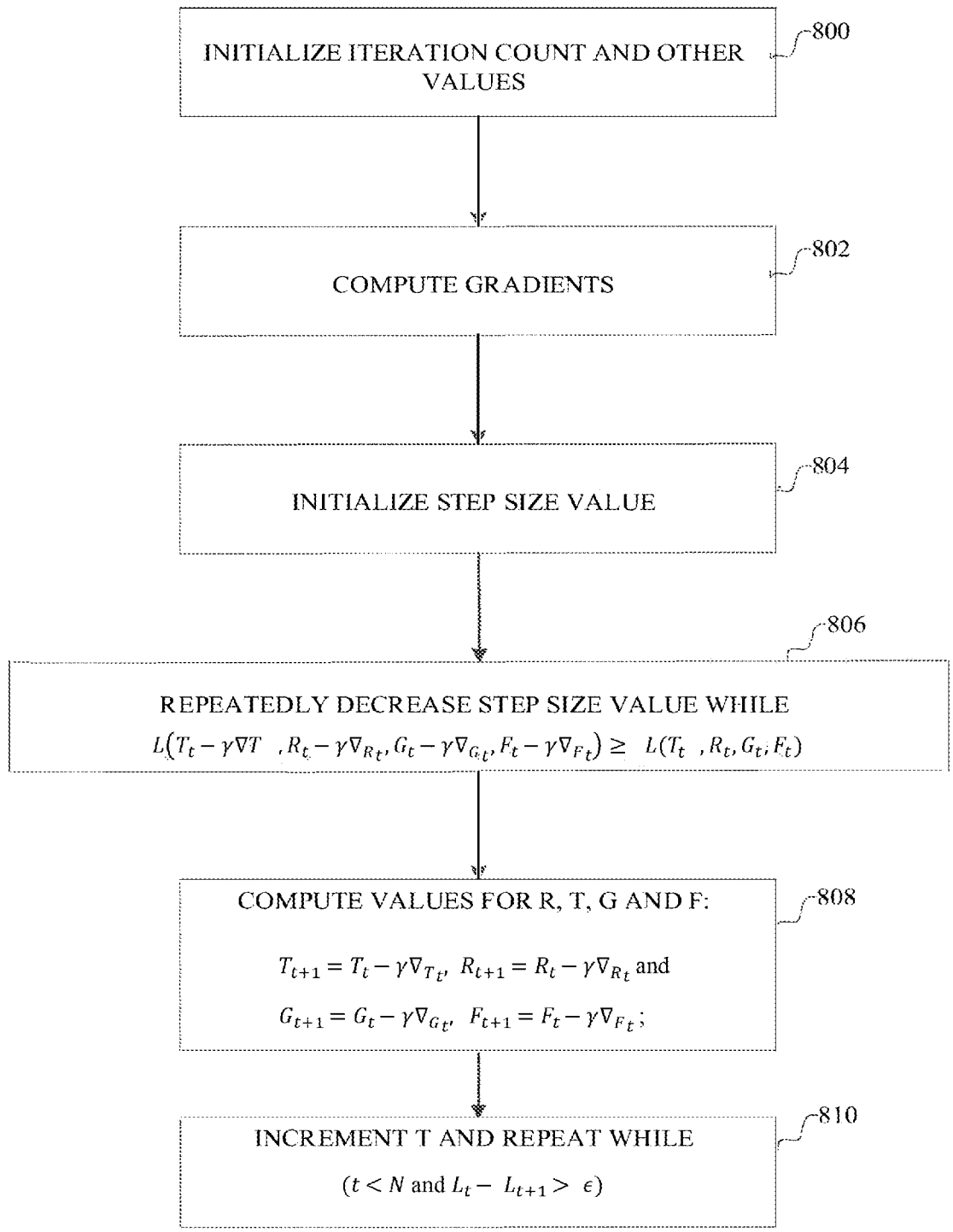
FIG. 8 is a flowchart describing operation of an example implementation of computing average traffic speed for each road segment.

The computational process of the gradient descent algorithm as applied using equations (5) and (6) as performed by the computer can be implemented as shown in FIG. 8. For example, an iterative process can be implemented, with a limit N on the number of iterations. The current iteration is represented by a variable, e.g., t, which is initialized at 800, e.g., to t=1, along with other variables in the computation. In each iteration, the gradients of equation 6 are computed 802. A maximal step size is then determined 804. For example, a step size value can be initialized to 1, and then repeatedly divided by 2 until the conditions indicated at 804 are met. The values of T, R, F and G are then updated at 806 and the current iteration counter is incremented at 808. If processing is complete, as indicated at 810 by the conditions indicate at 810 being met, then processing is complete and the desired output matrix is stored in memory.

Given the completed matrix X, which now includes an average speed for each road segment in the current time slot, a traffic volume calculation also can be performed, as will now be described in connection with FIG. 9.

There are several challenges with computing traffic volume. For example, it is impractical to directly measure traffic volume on all road segments. Also, using sampled traffic data, the occurrence of the sampled vehicles may be significantly different from the distribution of all vehicles on road segments in a geographical area.

One way to address this problem is to use the average speed data, and other related data, derived for all road segments, to train a model that determines traffic volume from this various data. For more accurate inference, a different model can be trained for different road types, for example defined by road level (e.g., highway, urban street), based on data from road segments of the corresponding road types. Thus, computing a traffic volume for a road segment involves identifying the type of the road segment and applying the model for that type to the data from road segments of that type to obtain a volume.

In one implementation, a traffic volume inference model is implemented using an unsupervised graphical model based on a partially observed Bayesian network. As shown in FIG. 9, the graphical model includes hidden nodes and observation nodes. A hidden node denotes a hidden variable to be computed; an observation node denotes available data.

Figure 9:
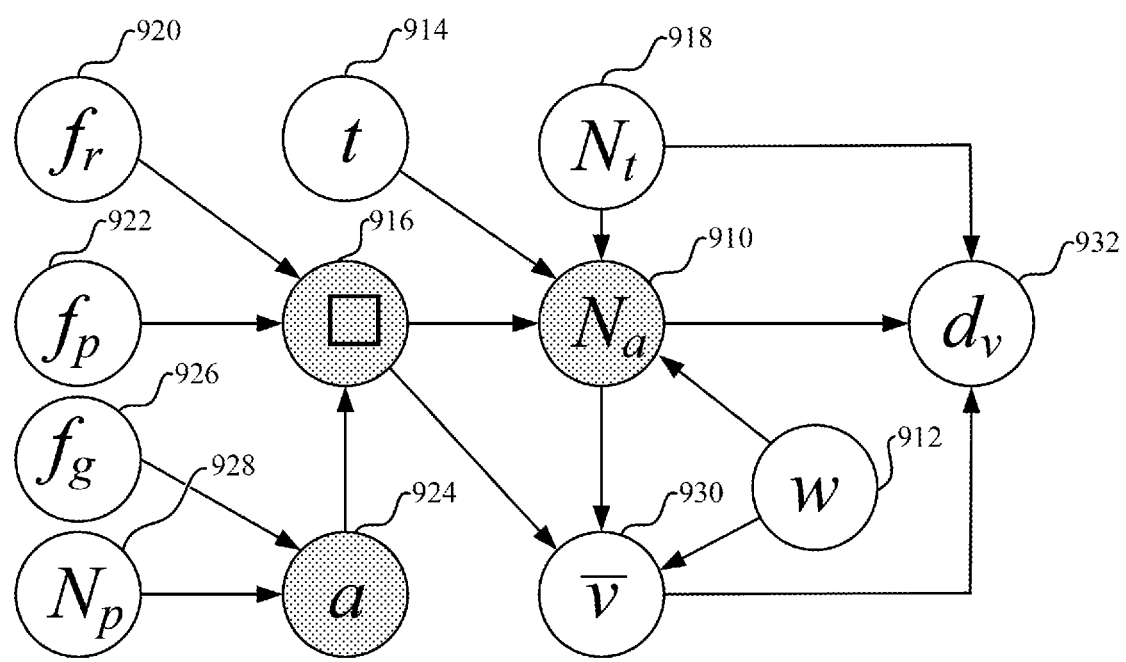
FIG. 9 is a diagram of an illustrative example of a model for computing traffic volume.

Specifically in FIG. 9, the traffic volume Na (910), i.e., the number of vehicles per minute per lane, of a lane of a road segment can be modeled as being influenced by four factors: weather conditions w (912), time of day t (914), the type of road Rt (916), and volume of observed sample vehicles Nt (918). The road type can be determined from various road network information. In this example, the model includes road network feature fr (920), such as length, global position features fg (922). The road type can be influenced by points of interest data A (924), such as the point of interest features (926), such as described above, and the total number of points of interest Np (928). The hidden nodes are traffic volume 910, road type 916 and point of interest data 924.

In FIG. 9, nodes 930 and 932 represent the average travel speed and speed variance, respectively, for the road segment in the current time slot as inferred from sampled vehicle data using techniques such as described above. The average travel speed 930 is determined by the road type 916, traffic volume 910 and weather 912. The speed variance is determined by the volume of observed sample vehicles 918, the traffic volume 910 and the average speed 930.

The model is trained using data from all road segments, and then is applied to infer the traffic volume for each road segment. This model assumes one lane of traffic. Thus, the output of this model for a given road segment is multiplied by the number of lanes of the road segment to produce the output volume for that road segment. In one implementation, an expectation-maximization (EM) algorithm can be used to learn the parameters of the model in FIG. 9 in an unsupervised manner. Computation of the algorithm is repeated iteratively until parameters converge, which provides a solution to the unknown parameters.

Given the average vehicle speed and average traffic volume per time slot, which can be computed in the manner described above, such information can be used to give an estimate of environmental measures, such as fuel consumption and vehicle emissions An example model for such calculation is the COPERT model, for which the portions that compute "hot emissions" can be determined using the traffic speed and volume data. Another example model for such calculation is the MOBILE model.

In the COPERT model, a generic parameterized formula is defined for fuel consumption and vehicle emissions for a single vehicle as a function of travel speed. Different parameters are defined by the model to calculate different kinds of emissions and fuel consumption. Assuming the emission as measured using the COPERT model for a single vehicle in a single time slot is EF, then the overall emission E on a certain road is defined by the product:

$$E = EF * r.Na * r.n * r.\text{len},$$

where r.Na is the traffic volume for the road segment, r.n is the number of lanes in the road segment and r.len is the length of the road segment.

Using an implementation such as described above, sparse sample data can be used in combination with correlation data to estimate average vehicle speed, and traffic volume, on road segments in a road network, for other roads where sampled vehicles have not traveled. Sensors transmit vehicle identification and position to the computer system for performing a real time measurement for data collected within a time slot. The computer system in turn can compute the speed, volume and environmental measures within a time slot to provide the measures in real time.

Accordingly, in one aspect, a computer system measures traffic speed on road segments of a road network. The computer system includes computer storage in which sample data is stored. The sample data associates speed of sampled vehicles on road segments to points of time in a plurality of time slots. The sample data is derived from location data received from sensors that provide location data over time of the sampled vehicles. Further, the computer storage includes correlation data defining correlations among road segments and correlations among time slots. One or more processing units are programmed to access the computer storage to process the sample data using the correlation data to provide an output describing, for each road segment in the road network, at least an average vehicle speed for each road segment in the road network for at least the current time slot.

In another aspect, a computer-implemented process includes receiving sample data associating speed of sampled vehicles on road segments to points of time in a plurality of time slots. The sample data can be derived from location data received from sensors that provide location data over time of the sampled vehicles. Correlation data defining correlations among road segments and correlations among time slots is accessed. The sample data is processed using the correlation data to provide an output describing, for each road segment in the road network, at least an average vehicle speed for each road segment in the road network for at least the current time slot.

In another aspect, the computer system includes a means for receiving sample data about sampled vehicles. The sample data associates speed of sampled vehicles on road segments to points of time in a plurality of time slots. The computer system includes a means for processing the sample data using correlation data to provide an output describing, for each road segment in the road network, at least an average vehicle speed for each road segment in the road network for at least the current time slot. The correlation data defining correlations among road segments and correlations among time slots.

In another aspect, a process includes receiving sample data about sampled vehicles. The sample data associates speed of sampled vehicles on road segments to points of time in a plurality of time slots. The process includes processing the sample data using correlation data to provide an output describing, for each road segment in the road network, at least an average vehicle speed for each road segment in the road network for at least the current time slot. The correlation data defining correlations among road segments and correlations among time slots.

Any of the foregoing aspects can be embodied in computer program instructions stored on one or more computer storage media which, when processed by a computer, configure the computer to implement a process or configure a general purpose computer system to implement a computer system.

Advantageously, such a computer system or process can process sample data from sensors for a time slot to produce an output for the time slot in real time within one time slot.

In any of the foregoing aspects, the output can include, for each road segment, an inferred traffic volume for each of the road segments for the current time slot. This output can further include, for each road segment, environmental measures derived from at least the traffic volume for the road segments. The output can further include, for each road segment, environmental measures derived from at least the average speed and the traffic volume for the road segments. The traffic volume for each road segment can be defined by a statistical model relating average speeds of the road segments and the road network information to the traffic volume.

In any of the foregoing aspects, the output can further include, for each road segment, environmental measures derived from at least the average speed for the road segments.

In any of the foregoing aspects, the correlation data can include road network information for each of the road segments and correlating the road segments. The correlation data can further include historic sample data including average speeds of sampled vehicles on the road segments in time slots prior to the current time slot. The road network information can include, for each road segment, a type of the road segment. More particularly, the road network information can include a matrix of road segments and features of the road segment. The historic sample information can include a matrix of time slots and average speeds for road segments in the time slots. The sample data can include a sparse matrix of time slots and speeds for the road segments in the time slots where sample vehicle traveled during the time slots. Processing the correlation data and the sample data in any of the foregoing aspects can include factorizing matrices to determine average speeds for other road segments where sample vehicles have not traveled in the current time slot.

In any of the foregoing aspects, the sample data can be received from sensors within the road network during a time slot. The sensors can be on the sampled vehicles on the road segments. The sensors can be on road segments in the road network.

In any of the foregoing aspects, the processing of the sample data by the one or more processing units for a current time slot occurs in real time within a time slot of receiving the sample data.

Figure 10:
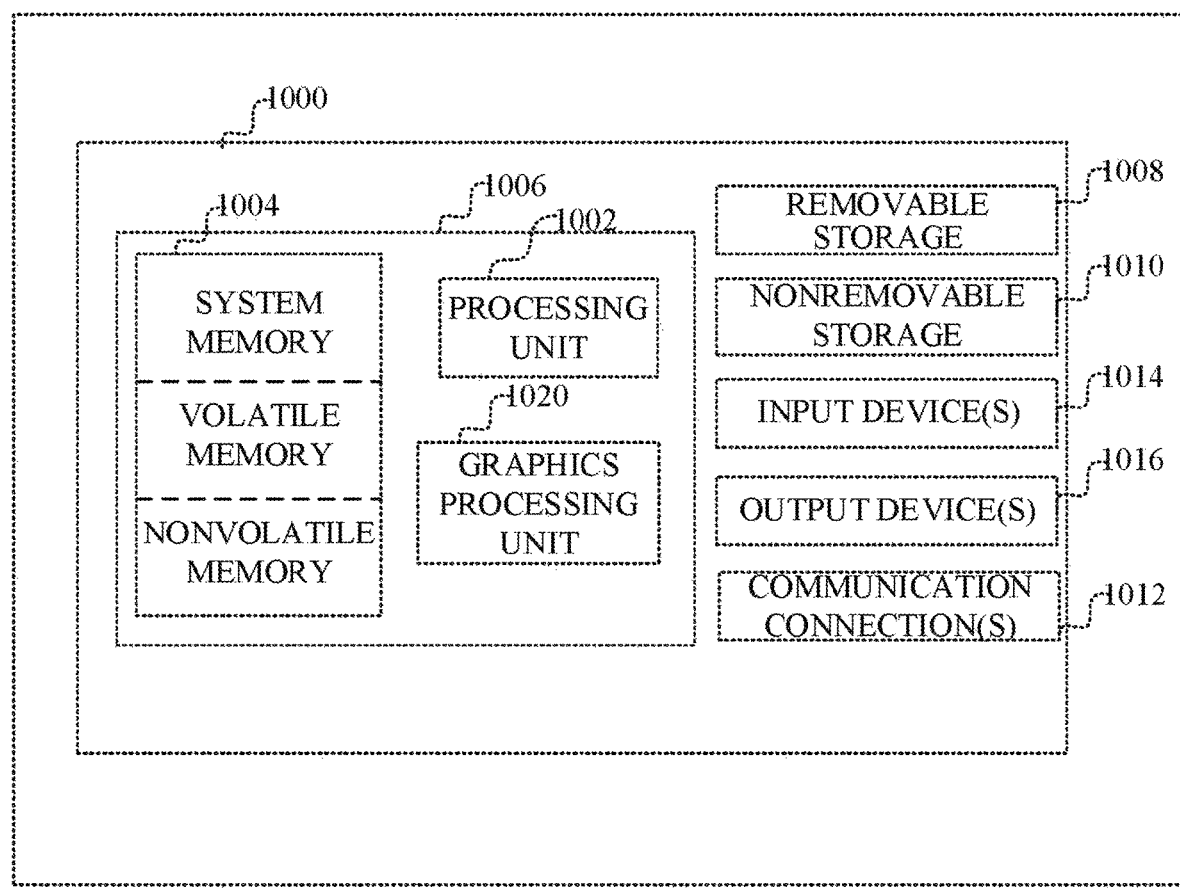
FIG. 10 is a block diagram of an example computer with which components of such a system can be implemented.

Having now described an example implementation, FIG. 10 illustrates an example computer with which the various components of the system of FIGS. 1-9 can be implemented. The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, network PCs, minicomputers, mainframe computers, and distributed computing environments that include any of the above types of computers or devices, and the like.

With reference to FIG. 10, an example computer 1000 includes at least one processing unit 1002 and memory 1004. The computer can have multiple processing units 1002. A processing unit 1002 can include one or more processing cores (not shown) that operate independently of each other. Additional co-processing units, such as graphics processing unit 1020, also can be present in the computer. The memory 1004 may be volatile (such as dynamic random access memory (DRAM) or other random access memory device), non-volatile (such as a read-only memory, flash memory, and the like) or some combination of the two. This configuration of memory is illustrated in FIG. 10 by dashed line 1006. The computer 1000 may include additional storage (removable and/or non-removable) including, but not limited to, magnetically-recorded or optically-recorded disks or tape. Such additional storage is illustrated in FIG. 10 by removable storage 1008 and non-removable storage 1010. The various components in FIG. 10 are generally interconnected by an interconnection mechanism, such as one or more buses 1030.

A computer storage medium is any medium in which data can be stored in and retrieved from addressable physical storage locations by the computer. Computer storage media includes volatile and nonvolatile memory, and removable and non-removable storage media. Memory 1004 and 1006, removable storage 1008 and non-removable storage 1010 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 1000 may also include communications connection(s) 1012 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 1012 are devices, such as a network interface or radio transmitter, that interface with the communication media to transmit data over and receive data from communication media.

Computer 1000 may have various input device(s) 1014 such as a keyboard, mouse, pen, camera, touch input device, and so on. Output device(s) 1016 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 1010, communication connections 1012, output devices 1016 and input devices 1014 can be integrated within a housing with the rest of the computer, or can be connected through input/output interface devices on the computer, in which case the reference numbers 1010, 1012, 1014 and 1016 can indicate either the interface for connection to a device or the device itself as the case may be.

A computer system generally includes an operating system, which is a computer program running on a computer that manages access to the various resources of the computer by applications. There may be multiple applications. The various resources include the memory, storage, input devices and output devices, such as display devices and input devices as shown in FIG. 10.

Each module of a computer system such as described in FIGS. 1-9 above, and which operates on a computer, can be implemented using one or more processing units of a computer with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

This computer system may be practiced in distributed computing environments where operations are performed by multiple computers that are linked through a communications network. In a distributed computing environment, computer programs may be located in both local and remote computer storage media.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. § 101.

The invention may be embodied as a computer system, as any individual component of such a computer system, as a process performed by such a computer system or any individual component of such a computer system, or as an article of manufacture including computer storage with computer program instructions are stored and which, when processed by computers, configure those computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system for measuring traffic speed on road segments of a road network in a geographic area, comprising:
   a processor; and
   a storage device holding instructions executable by the processor to:
      receive sample data collected by sensors, the sample data indicating vehicle speeds for corresponding road segments and corresponding time slots, wherein the sample data is missing a speed value for at least one road segment and time slot;
      maintain a correlation data matrix including geographical and historical features related to the road segments;
      decompose the sample data and the correlation data matrix using context-aware matrix factorization to compute a plurality of factor matrices; and multiply one of the plurality of factor matrices with at least another of the plurality of factor matrices to compute a missing vehicle speed for a road segment for which the sample data is missing the speed value for that road segment and time slot.

2. The computer system of claim 1, wherein the instructions are further executable by the processor to output, for each road segment, an inferred traffic volume for the road segment.

3. The computer system of claim 2, wherein the instructions are further executable by the processor to output, for each road segment, environmental measures derived from at least the traffic volume for the road segments.

4. The computer system of claim 2, wherein the instructions are further executable by the processor to output, for each road segment, environmental measures derived from at least the vehicle speed and the traffic volume for the road segments.

5. The computer system of claim 4, wherein traffic volume for each road segment is defined by a statistical model relating vehicle speeds of the road segments and the road network information to the traffic volume.

6. The computer system of claim 1, wherein the instructions are further executable by the processor to output, for each road segment, environmental measures derived from at least the vehicle speed for the road segments.

7. The computer system of claim 1, wherein the correlation data matrix is one of a plurality of correlation data matrices, the plurality of correlation data matrices including a road network information matrix and a historic sample data matrix.

8. The computer system of claim 7, wherein the road network information matrix correlates road segments with features of road segments, including, for each road segment, a type of the road segment.

9. The computer system of claim 7, wherein the historic sample data matrix correlates
time slots with average speeds for road segments in the time slots.

10. The computer system of claim 1, wherein the sensors are on one or more of 1) vehicles within the road network and 2) road segments within the road network.

11. The computer system of claim 10, wherein the sensors are on vehicles using the road network.

12. The computer system of claim 10, wherein the sensors are on road segments in the road network.

13. The computer system of claim 1, wherein the instructions are further executable to maintain a coarse-grained region-level data matrix, wherein:
the sample data includes a fine-grained road-segment data matrix and the correlation data matrix; and
decomposing the sample data and the correlation data matrix using context-aware matrix factorization includes collaboratively factoring the fine-grained road-segment data matrix, the coarse-grained region-level data matrix, and the correlation data matrix.

14. A computer-implemented process comprising:
receiving sample data collected by sensors, the sample data indicating vehicle speeds for corresponding road segments and corresponding time slots, wherein the sample data is missing a speed value for at least one road segment and time slot;
maintaining a correlation data matrix including geographical and historical features related to the road segments;
decomposing the sample data and the correlation data matrix using context-aware matrix factorization to compute a plurality of factor matrices; and
multiplying one of the plurality of factor matrices with at least another of the plurality of factor matrices to compute a missing vehicle speed for a road segment for which the sample data is missing the speed value for that road segment and time slot.

15. The computer-implemented process of claim 14, further comprising outputting, for each road segment, an inferred traffic volume for the road segment.

16. The computer-implemented process of claim 15, further comprising outputting, for each road segment, environmental measures derived from at least the traffic volume for the road segments.

17. The computer-implemented process of claim 14, wherein the correlation data matrix is a road network information matrix correlating road segments with features of road segments, including, for each road segment, a type of the road segment.

18. The computer-implemented process of claim 14, wherein the correlation data matrix is a historic sample data matrix correlating time slots with average speeds for road segments in the time slots.

19. The computer-implemented process of claim 14, further comprising maintaining a coarse-grained region-level data matrix, wherein:
the sample data includes a fine-grained road-segment data matrix and the correlation data matrix; and
decomposing the sample data and the correlation data matrix using context-aware matrix factorization includes collaboratively factoring the fine-grained road-segment data matrix, the coarse-grained region-level data matrix, and the correlation data matrix.

20. An article of manufacture, comprising:
one or more computer storage media comprising at least one of a memory device and a storage device;
computer program instructions stored on the one or more computer storage media and configured to be processed by a computer, the instructions comprising:
instructions for receiving sample data collected by sensors, the sample data indicating vehicle speeds for corresponding road segments and corresponding time slots, wherein the sample data is missing a speed value for at least one road segment and time slot;
instructions for maintaining a correlation data matrix including geographical and historical features related to the road segments;
instructions for decomposing the sample data and the correlation data matrix using context-aware matrix factorization to compute a plurality of factor matrices; and
instructions for multiplying one of the plurality of factor matrices with at least another of the plurality of factor matrices to compute a missing vehicle speed for a road segment for which the sample data is missing the speed value for that road segment and time slot.

* * * * *